March 7, 1950     N. A. PENNINGTON     2,499,411
AIR CONDITIONER HAVING THERMOSTATIC CONTROL Filed Jan. 2, 1948     2 Sheets-Sheet 1

NEAL A. PENNINGTON,
INVENTOR,

BY Roger Sherman Hoar

ATTORNEY.

March 7, 1950   N. A. PENNINGTON   2,499,411
AIR CONDITIONER HAVING THERMOSTATIC CONTROL
Filed Jan. 2, 1948   2 Sheets-Sheet 2
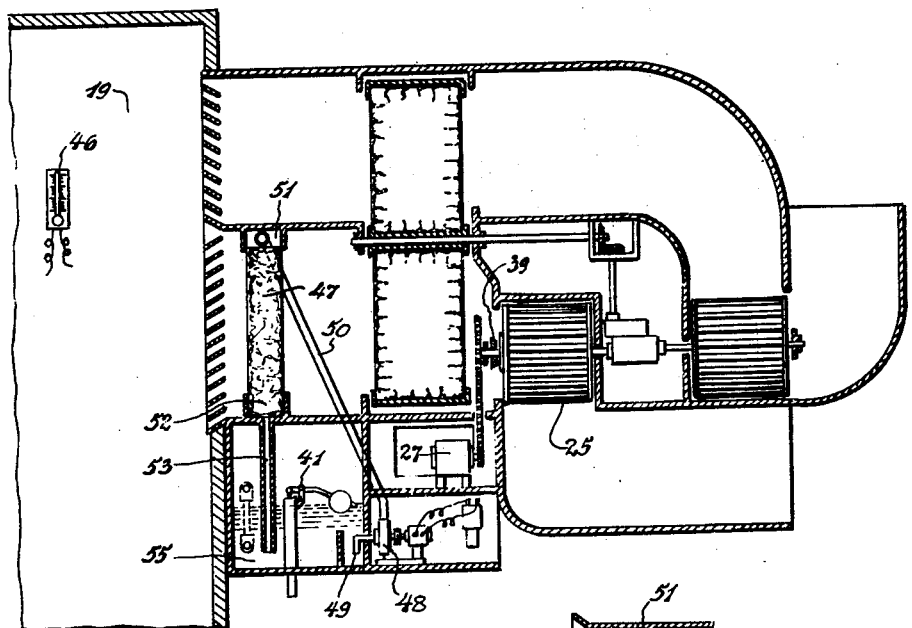
Fig. 4.
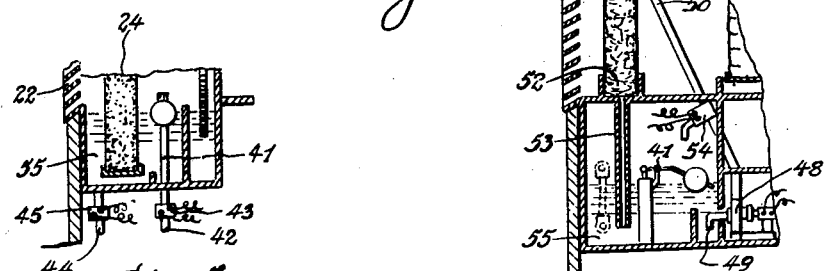
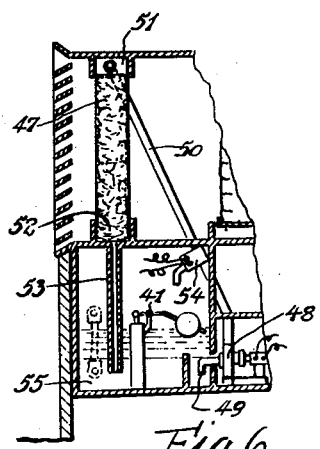
Fig. 5.   Fig. 6.
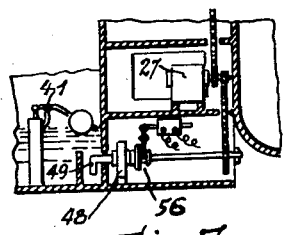
Fig. 7.
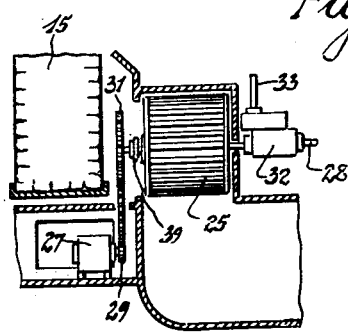
Fig. 8.
NEAL A. PENNINGTON,
INVENTOR,
BY Roger Sherman Hoar
ATTORNEY.

Patented Mar. 7, 1950

2,499,411

UNITED STATES PATENT OFFICE 2,499,411

AIR CONDITIONER HAVING THERMOSTATIC CONTROL

Neal A. Pennington, Tucson, Ariz., assignor of one-fifth to Robert H. Henley, Tiptonville, Tenn., and one-fourth to Roger S. Hoar, South Milwaukee, Wis.

Application January 2, 1948, Serial No. 53

14 Claims. (Cl. 62—6)

My invention relates to new and useful improvements in air-conditioning apparatus, and more particularly to improvements in that type of air-conditioning apparatus shown and described in various copending applications of mine (especially: Serial No. 513,167, filed December 6, 1943, now abandoned; Serial No. 640,792, filed January 12, 1946, now matured into Patent No. 2,242,766, issued March 16, 1949, a part of its original subject-matter being now embodied in a divisional application, Serial No. 55,594, filed October 20, 1948; Serial No. 676,962, filed June 15, 1946; and Serial No. 694,972, filed September 5, 1946), the common feature of all of which is to evaporatively cool exhaust air from the space which is being conditioned, and then cool the incoming air by anhydrous heat-exchange with the thus cooled exhaust air.

Still more particularly, my invention relates to new and useful improvements in thermostatic control of the cooling effected by such apparatus.

I realize that the mere employing of a thermostat (influenced by the dry-bulb temperature of the space which is being conditioned) to turn on and off the apparatus which is cooling the air for that space, would be obvious and non-inventive.

So the primary objective of my present invention has been to devise means whereby my thermostat controls my air-conditioning apparatus in a novel and more efficient manner than would the obvious method of using a thermostat.

More particularly my objective is to apply my thermostatic control to merely certain parts of my air-conditioning apparatus, selecting these parts and the exact manner of their control to the end that I may obtain a more sensitive and more uniform regulation of the dry-bulb temperature of the space than would otherwise be possible.

Still more particularly my objective is to attain modulated control of the dry-bulb temperature of the incoming air, in response to the dry-bulb temperature of the space, by means of thermostatically shutting off and turning on a portion of my air-conditioning apparatus, instead of by resorting to the complicated prior-art expedient of adjusting some portion of the apparatus in a succession of steps in thermostatic response to a succession of temperatures.

In addition to the objects above stated, I have worked out a number of novel and useful details, which will be readily evident as the description progresses.

My invention consists in the novel parts and in the combination and arrangement thereof, which are defined in the appended claims, and of which one embodiment is exemplified in the accompanying drawings, which are hereinafter particularly described and explained.

Throughout the description the same reference number is applied to the same member or to similar members.

Figure 4 is a vertical longitudinal section of a second variant of my present invention, namely as applied to air-conditioning apparatus having a non-rotating water-pad, and a pumped water-circuit.

Figure 5 is a portion of Figure 1, revised to illustrate a subvariant of my first variant.

Figure 6 is a portion of Figure 4, revised to illustrate a subvariant of my second variant.

Figure 7 is a portion of Figure 4, revised to illustrate another subvariant of my second variant.

Figure 8 is a portion of Figure 1 or Figure 4, revised to illustrate another subvariant of either of my two variants.

Figure 1:
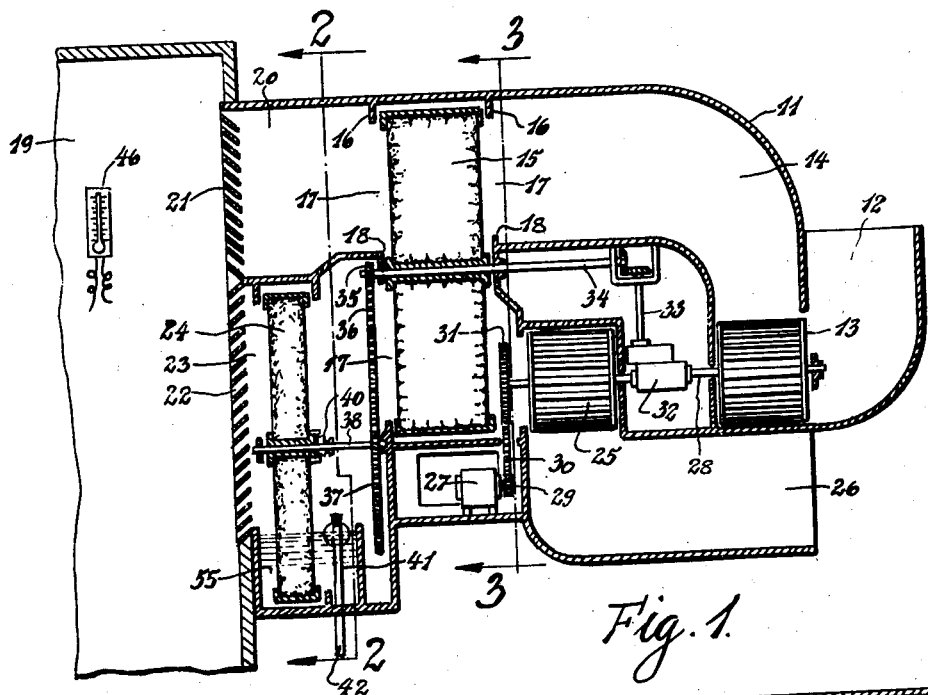
Figure 1 is a vertical longitudinal section of one variant of my present invention, namely as applied to air-conditioning apparatus having a rotating water-pad, and no pump.
Figure 2:
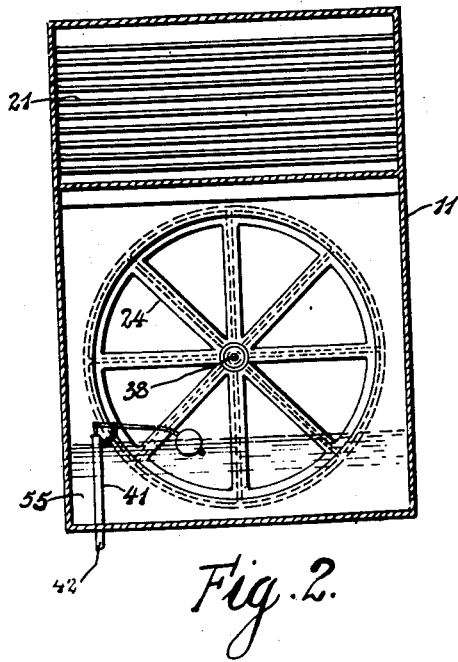
Figure 2 is a vertical transverse section of the same variant, taken along the lines 2—2 of Figure 1.
Figure 3:
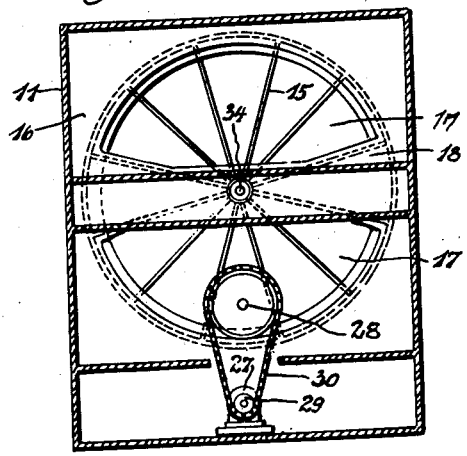
Figure 3 is a second vertical transverse section of the same variant, taken along the lines 3—3 of Figure 1.

Referring now to Figure 1, we see that 11 is the main container of my invention, in which 12 is an air-inlet from outdoors. 13 is a centrifugal fan, which impels incoming air into passage 14, and thence through the upper portion of rotating heat-transfer pad 15, which is similar to the "aluminum-wool pad" of my copending Patent No. 2,242,766, containing a packing of highly heat-absorbent material as there described, and rotating at a speed of about 30 R. P. M.

This pad 15, like the corresponding pad of the earlier case, rotates in a casing 16, each face of which has two sectorial orifices 17, separated from each other by a bridge 18.

The incoming air, after having been thus anhydrously cooled by heat-exchange by this heat-transfer pad 15, passes into the enclosure 19 through passage 20 and louvres 21. The "incoming" air need not necessarily all, or even in part, come from outdoors as shown. Suffice it to say that it is the air which is being air-conditioned, for the purpose of air-conditioning the space into which this particular air, or some of it, is admitted.

Certain air passes from enclosure 19 through louvres 22 into passage 23, where it encounters water-pad 24, rotating at a speed of about 3 R. P. M., partly in water-trough 55 and partly in passage 23. This water-pad 24 is sectorially constructed like similar pads in my copending application, Serial No. 640,792, now Patent No. 2,242,766, the sectors (as there) being packed with excelsior or other water-absorbent material. This "certain" air preferably, but no necessarily is derived from the enclosure being conditioned, and hence in my specification, although not in my claims, will be referred to as "outgoing" air.

This outgoing air, having been evaporatively cooled in water-pad 24, cools heat-transfer pad 15, and then is sucked by centrifugal fan 25 into air-outlet 26, through which it is discharged outdoors or into the attic.

Motor 27 drives shaft 28 through pulley 29, belt 30, and pulley 31.

Shaft 28 drives the two fans, 13 and 25, at a high rate of speed. Also, through gear reduction 32, shaft 28 drives shaft 33, and thereby shaft 34, at about 30 R. P. M., thus driving heat-exchange pad 15 (keyed to shaft 34) at about 30 R. P. M.

Through pulley 35, belt 36, and pulley 37, shaft 34 drives shaft 38 at about 3 R. P. M., and hence drives water-pad 24 (clutched to shaft 38) at about 3 R. P. M.

Tank 55 is kept filled with water by a float-valve 41.

Thus far I have described nothing beyond the disclosures of my earlier applications.

It should now be noted that water-pad 24 is clutched to shaft 38 by electrically controlled clutch 40.

There is a thermostat 46, preferably of narrow range, responsive to the dry-bulb temperature of the air in space 19.

In the broad scope of my invention, it is not essential that this thermostat be thus placed. Suffice it that the thermostat be so placed as to be responsive to the dry-bulb temperature of any "other" air than the air whose characteristics it directly controls. For example, if desired, by placing the thermostat in passage 17 to the left of pad 15, my control system could equally well be used to regulate indirectly the temperature of the incoming air, as to regulate indirectly the temperature of the air in the space being conditioned.

Thermostat 46 is operatively connected to clutch 40 in a manner so that, when the dry-bulb temperature affecting the thermostat falls to a predetermined minimum, clutch 40 will open, thus stopping the rotation of water-pad 24.

Turning now to the variant of Figure 4, we see that it is identical to my first-described variant, except as follows:

A fixed water-pad 47 is substituted for the rotating water-pad 24 of the first variant. This pad 47 is kept moistened by pump 48 drawing water from tank 55 through pipe 49, and delivering this water through pipe 50 to trough 51, whence the water seeps down through pad 47. So much of this water as does not evaporate in its downward passing through pad 47, is collected in trough 52, and thence passes through pipe 53 back into tank 55 again.

Thermostat 46 is electrically coupled to pump 48 in such manner that, whenever the dry-bulb temperature of the air at the thermostat reaches a predetermined minimum, the pump is stopped; and whenever the dry bulb temperature of the air at the thermostat reaches a predetermined maximum, the pump starts again.

In each of these two variants, although the attainment of the predetermined minimum temperature at the thermostat results in the immediate and complete shutting off of water from the evaporative pad (24 of Figure 1; 47 of Figure 4), this does not result in an immediate hot blast of outdoor air, as would occur if the evaporation itself or the heat-exchange between the two air-streams were completely stopped; nor does it result in the cessation of the supplying of fresh air to the enclosure; nor the cessation of the exhausting of stale air from the enclosure, as would occur if the whole apparatus were thermostatically shut off.

On the contrary, inasmuch as it takes a considerable time (30 minutes or so) for the water-content of the pad to completely evaporate, even after the water-supply is completely shut off, evaporative cooling of the outgoing air continues, although this cooling immediately begins to shade off. Thus we obtain a modulated reduction of the dew-point of the outgoing air by an infinite succession of infinitesimal stages—and (due to the fact that the heat-exchanger between the two air-streams has not been shut off) consequent modulated increase of the dry-bulb temperature of the incoming air by an infinite succession of infinitesimal stages. This modulation continues for a short time until the temperature of the enclosure being conditioned rises a predetermined amount, thus reversing the action of the thermostat, which causes a resumption of the water-supply to the water-pad. Whereupon gradually, although at a much faster rate than in the shading-off, the dew-point of the outgoing air rises to approach its highest possible upper limit, and therefore its dry-bulb temperature correspondingly falls, and therefore (by heat exchange between the two air-streams) the dry-bulb temperature of the incoming air is reduced to approach its lowest possible lower limit.

If the range of the thermostat is sufficiently small, the dew-point of the outgoing air will become and remain modulated to an almost constant value just proper to cause the incoming air to have just the right dry-bulb temperature to maintain the air temperature at the thermostat practically constant. The water-supply will be normally shut-off, but at intervals turned on just long enough to give the water-pad a shot of water just sufficient to maintain its water-content at the optimum degree of saturation. The frequency and duration of these shots of water will then vary only with changes in room-load and/or in the characteristics of the incoming air.

Other ways of shutting off the water-supply from the water-pad could be employed.

For example, Figure 5 shows a revision of the water-tank of Figure 1, the rest of my apparatus being unchanged. In this subvariant of my first variant, the float-valve 41 receives water through pipe 42 and electric valve 43. Also tank 55 can be drained through pipe 44 and electric valve 45. Valve 43 is normally open, but can be closed electrically, or vice versa. Valve 45 is normally closed, but can be opened electrically or vice versa. These two valves are electrically coupled with thermostat 46 in such manner that, whenever the dry-bulb temperature of the air at the thermostat reaches a predetermined minimum, valve 43 is closed, and valve 45 is opened, to drain the tank; and whenever the dry-bulb temperature of the air at the thermostat reaches a predetermined maximum, valve 43 is opened and valve 45 is closed, to refill the tank. In this subvariant, water-pad 24 continues to rotate.

Figure 6 shows a revision of water-circuit of Figure 4, the rest of my apparatus being unchanged. In this subvariant of my second variant, there is a by-pass electric valve 54 associated with water-pipe 50. This valve is normally closed, but can be opened electrically, or vice versa. The exact location and nature of this valve is immaterial, provided it functions to route water alternatively to pad 47 or back to tank 55. This valve is electrically coupled with thermostat 46, in such manner that, whenever the dry-bulb temperatures of the air at the thermostat reaches a predetermined minimum, valve 54 causes the water to by-pass to tank 55, and whenever the dry-bulb temperature of the air at the thermostat reaches a predetermined maximum, valve 54 causes the water to proceed through pipe 50, to water-pad 47. In this subvariant, pump 48 continues to operate, due to which fact it could be driven by main motor 27 (as in Figure 7), instead of by its own motor (as here shown).

Figure 7 shows a revision of the pump of Figure 4, the rest of my apparatus remaining unchanged. In this subvariant of my second variant, pump 48 is preferably (although not necessarily) driven by main motor 27, instead of by its own motor. In either case, it is driven through electrically controlled clutch 56, which is electrically coupled with thermostat 46 in such manner that, whenever the dry-bulb temperature of the air at the thermostat reaches a predetermined minimum, the pump is stopped by declutching, and whenever the dry-bulb temperature of the air at the thermostat reaches a predetermined maximum, the pump is reclutched and thus started again.

All five subvariants, thus far discussed, operate in substantially the same manner, namely by abruptly cutting off the water supply from the water-pad, thereby causing a gradual diminution of water in the water-pad, thereby modulating the dew-point of the outgoing air down and thereby correspondingly modulating the dry-bulb temperature of this air upward, and thereby (by heat-transfer between the two streams) modulating the dry-bulb temperature of the incoming air upward. This continues until the temperature of the air at the thermostat rises sufficiently to cause the thermostat to reverse, whereupon water again is supplied to the water-pad, and a more rapid reverse modulation occurs. During all this cycle, there is no interruption of air-circulation.

Whenever herein I refer to cutting off the water supply, it is to be understood that it is within the purview of my invention to cut off the water supply not quite completely, if a somewhat slower rate of modulation is desired. This can be accomplished in any one of a number of ways, such as by greatly reducing the speed of rotation of the water-pad, instead of stopping it; or by not fully draining the tank; or by greatly reducing the pump output, instead of stopping the pump; or by by-passing not quite all of the water.

We now come to two subvariants which depart materially from the cycle of the above-described five subvariants, although still involving generically the idea of indirect regulation of the characteristics of the incoming air, and to some slight extent involving the principle of modulation.

Figure 8 shows a revision of exhaust fan 25 either of the variant of Figure 1 or of the variant of Figure 4, the rest of either variant remaining unchanged. In each of these two subvariants, fan 25 is clutched to shaft 28 by electrically controlled clutch 39, which is electrically connected to thermostat 46 in such manner that, whenever the dry-bulb temperature of the air at the thermostat reaches a predetermined minimum, this fan is stopped by declutching, and whenever the dry-bulb temperature of the air at the thermostat reaches a predetermined maximum, the fan is reclutched and thus started again.

These two subvariants are much more abrupt than the five subvariants first described, but nevertheless some modulation does occur. For due to the continued input of air into the enclosure which is being conditioned, there will be some air passing out through the evaporative water-pad and hence some continued indirect cooling of the incoming air.

In these two subvariants it might be preferable to substitute a one-stage slow-down of fan 25, instead of completely declutching it.

The electric clutches, electric valves, electric motor-controls, change-speed devices, and thermostat mentioned in connection with one or more of my seven subvariants, may each be of any convenient and/or conventional sort, their respective details constituting no part of my invention.

As to all of my subvariants, the particular nature of my air-conditioning apparatus, as covered by my copending applications, contributes to enhance the effectiveness of the controls which are the subject-matter of this present application; but it should be readily evident that my controls are adapted for use with a somewhat wider genus of air-conditioning apparatus.

Having now described and illustrated seven forms of my present invention, I wish it to be understood that my invention is not to be limited to the specific forms or arrangements of parts herein described and shown.

I claim:

1. In combination with a device for anhydrously cooling an enclosure, which device includes a water-holding pad for evaporatively cooling certain air, and means to supply water to said pad, and means for cooling incoming air by anhydrous heat exchange with the thus-cooled certain air, and means for then admitting the incoming air to the enclosure: a control system comprising a thermostat responsive to the dry-bulb temperature of air other than the thus cooled certain air, and means controlled by said thermostat to abruptly reduce the supplying of water to the pad in response to the air at the thermostat attaining a predetermined minimum dry-bulb temperature, and to abruptly restore the full supplying of water to the pad in response to the air at the thermostat attaining a predetermined maximum dry-bulb temperature; whereby an abrupt non-modulated thermostatic control of the device attains a modulated change in the dry-bulb temperature of the incoming air.

2. A control system according to claim 1, further characterized by the fact that the thermostat is so located as to be responsive to the dry-bulb temperature of the air in the enclosure.

3. A control system according to claim 2, further characterized by the fact that the reduction of the supplying of water to the pad constitutes an abrupt full stop thereof.

4. A control system according to claim 1, further characterized by the fact that the pad is bodily moveable, and that the means for supplying water to the pad comprises a water tank and means to move the pad from and to the tank to and from the certain air, and that the thermostat serves to abruptly reduce this motion of the pad in response to the air at the thermostat attaining a predetermined minimum dry-bulb temperature, and to abruptly restore full motion to the pad in response to the air at the thermostat attaining a predetermined maximum dry-bulb temperature.

5. A control system according to claim 4, further characterized by the fact that the reduction of the motion of the pad constitutes an abrupt full stop thereof.

6. A control system according to claim 1, further characterized by the fact that the pad is fixed in the certain air.

7. A control system according to claim 6, further characterized by the fact that the means to supply water to the pad includes a water-source, a water-conduit leading to the pad, and a pump to draw water from the source and deliver it through the conduit to the pad.

8. A control system according to claim 7, further characterized by the fact that the thermostat serves to stop the pump in response to the air at the thermostat attaining a predetermined minimum dry-bulb temperature, and to start the pump again in response to the air at the thermostat attaining a predetermined maximum dry-bulb temperature.

9. A control system according to claim 8, further characterized by the fact that the pump has its own motor, and that the thermostat serves to shut off and turn on this motor.

10. In combination with a device for anhydrously cooling an enclosure, in which device certain air is cooled by the evaporation of water therein, and in which device incoming air is cooled by anhydrous heat exchange with the thus-cooled certain air, and then this incoming air is admitted to the enclosure; a control system comprising a thermostat responsive to the dry-bulb temperature of air other than the thus cooled certain air, and means controlled by said thermostat to abruptly reduce the flow of the thus cooled certain air through the heat-exchange means in response to the air at the thermostat attaining a predetermined minimum dry-bulb temperature, and to abruptly restore full flow of such thus cooled certain air in response to the air at the thermostat attaining a predetermined maximum dry-bulb temperature; whereby an abrupt non-modulated thermostatic control of the device attains a modulated change in the dry-bulb temperature of the incoming air.

11. A control system according to claim 10, further characterized by the fact that the thermostat is so located as to be responsive to the dry-bulb temperature of the air in the enclosure.

12. A control system according to claim 11, further characterized by the fact that there is a fan to impel the flow of the certain air, and that the thermostat serves to reduce the speed of this fan in response to the air at the thermostat attaining a predetermined minimum dry-bulb temperature, and to restore full speed to this fan in response to the air at the thermostat attaining a predetermined maximum dry-bulb temperature.

13. A control system according to claim 12, further characterized by the fact that the speed reduction of the fan constitutes a full stop thereof.

14. A control system according to claim 13, further characterized by the fact that there is a motor to drive the fan and other instrumentalities of the device, and that the thermostat serves to declutch the fan from the motor, and to reclutch it to the motor.

NEAL A. PENNINGTON.

REFERENCES CITED

The following references are of record in the file of this patent:

UNITED STATES PATENTS

| Number | Name | Date |
|---|---|---|
| 2,058,042 | Shipman | Oct. 20, 1936 |
| 2,075,036 | Hollis | Mar. 30, 1937 |

Certificate of Correction

Patent No. 2,499,411

March 7, 1950

NEAL A. PENNINGTON

It is hereby certified that errors appear in the printed specification of the above numbered patent requiring correction as follows:

Column 1, line 7, after "abandoned" and before the semicolon insert the comma and words , *having first been superseded by a continuation, Serial No. 672,242, filed May 25, 1946*; line 9, for the patent number "2,242,766" read *2,464,766*; same line, for "March 16" read *March 15*; column 2, line 39 and column 3, line 10, for "2,242,766" read *2,464,766*;

and that the said Letters Patent should be read with these corrections therein that the same may conform to the record of the case in the Patent Office.

Signed and sealed this 15th day of August, A. D. 1950.

[SEAL]

THOMAS F. MURPHY,
*Assistant Commissioner of Patents.*